(12) United States Patent
Advani et al.

(10) Patent No.: US 10,839,618 B2
(45) Date of Patent: Nov. 17, 2020

(54) APPLIED ARTIFICIAL INTELLIGENCE FOR NATURAL LANGUAGE PROCESSING AUTOMOTIVE REPORTING SYSTEM

(71) Applicant: HONDA MOTOR CO., LTD., Minato-ku, Tokyo (JP)

(72) Inventors: Ravi Advani, Torrance, CA (US); Mithun Balakrishna, Richardson, TX (US); Tatiana Erekhinskaya, Dallas, TX (US)

(73) Assignee: HONDA MOTOR CO., LTD., Tokyo (JP)

( * ) Notice: Subject to any disclaimer, the term of this patent is extended or adjusted under 35 U.S.C. 154(b) by 197 days.

(21) Appl. No.: 16/033,846

(22) Filed: Jul. 12, 2018

(65) Prior Publication Data
US 2020/0020179 A1 Jan. 16, 2020

(51) Int. Cl.
*G07C 5/00* (2006.01)
*G10L 15/26* (2006.01)
(Continued)

(52) U.S. Cl.
CPC ........... *G07C 5/008* (2013.01); *G06F 40/284* (2020.01); *G06F 40/295* (2020.01); *G06N 20/00* (2019.01);
(Continued)

(58) Field of Classification Search
CPC .. G06F 40/30; G06F 16/248; G06F 16/90332; G06F 16/3329
See application file for complete search history.

(56) References Cited

U.S. PATENT DOCUMENTS 9,672,497 B1 * 6/2017 Lewis ................... G06F 40/284
10,453,036 B1 * 10/2019 Lewis ................... G06Q 10/20
(Continued)

FOREIGN PATENT DOCUMENTS

GB 2541649 A 3/2017

OTHER PUBLICATIONS

Coombs, A., "Understanding Sentiment Analysis in Social Media Monitoring," Unamo Blog, Sep. 2017.
(Continued)

*Primary Examiner* — Matthew H Baker
(74) *Attorney, Agent, or Firm* — Arent Fox LLP

(57) ABSTRACT

The present disclosure provides a computer system, method, and computer-readable medium for a computer processor to determine whether to report a consumer message regarding a vehicle to a regulatory agency. The computer system receives a message from a consumer. The computer system applies the message to a machine learning classifier trained to determine whether a category of vehicle system is described in the message, the machine learning classifier trained using category definitions and corresponding parts and symptoms labeled with the category definitions. The computer system determines whether the message includes a complaint based on an ontology defining a vehicle problem lexicon, a car part lexicon, and lexical patterns. The computer system extracts MVS terms from the message. The computer system determines to report the message if the message includes a complaint related to at least one category of vehicle system and includes a set of the MVS terms.

20 Claims, 6 Drawing Sheets

(51) Int. Cl.

| | |
|---|---|
| *G07C 5/08* | (2006.01) |
| *G06N 20/00* | (2019.01) |
| *G06F 40/284* | (2020.01) |
| *G06F 40/295* | (2020.01) |
| *G06F 40/30* | (2020.01) |
| *G06F 16/248* | (2019.01) |
| *G06F 16/9032* | (2019.01) |

(52) U.S. Cl.
CPC .......... *G07C 5/0841* (2013.01); *G10L 15/265* (2013.01); *G06F 16/248* (2019.01); *G06F 16/90332* (2019.01); *G06F 40/30* (2020.01)

(56) References Cited

U.S. PATENT DOCUMENTS

| | | |
|---|---|---|
| 2011/0119231 A1 | 5/2011 | Namburu et al. |
| 2013/0085745 A1 | 4/2013 | Koister et al. |
| 2014/0095484 A1 | 4/2014 | Kursar et al. |
| 2016/0162456 A1 | 6/2016 | Munro et al. |
| 2017/0091289 A1 | 3/2017 | Ohazulike et al. |
| 2017/0316421 A1 | 11/2017 | Xu et al. |
| 2018/0032507 A1 | 2/2018 | Mikhaylov et al. |

OTHER PUBLICATIONS

HoogerHeyde, C., "Natural Language Processing of Consumer Complaint Narratives with SODAPy and Algorithmia," Blog, May 3, 2016.

* cited by examiner

APPLIED ARTIFICIAL INTELLIGENCE FOR NATURAL LANGUAGE PROCESSING AUTOMOTIVE REPORTING SYSTEM

TECHNICAL FIELD

The present disclosure relates to natural language processing, and more particularly, to natural language processing regarding automotive lexicons.

BACKGROUND

Original equipment manufacturers of vehicles are subject to regulation by the National Highway Traffic Safety Administration (NHTSA). One NHTSA program is Early Warning Reporting (EWR) regulations that implement the Transportation Recall Enhancement, Accountability, and Documentation (TREAD) act of 2000. These regulations require manufacturers to submit information that could assist the agency in determining whether a safety related defect exists in a vehicle or equipment item used in the United States. In particular, under EWR regulations, manufacturers must report to NHTSA production-related information, incidents related to a death or injury, consumer complaints, warranty claims, property damage claims, and field reports.

Of these reporting requirements, consumer complaints may be a burdensome requirement because a vehicle manufacturer may have multiple points of contact with consumers that potentially may result in a consumer complaint. For example, a manufacturer may communicate with consumers via designated email addresses, manufacturer hosted web forums or message boards, automated chat-bot services, and other channels. The variety of communication channels may produce numerous communications that may qualify as a reportable consumer complaint. Conventionally, human analysts manually review each communication to determine whether the communication includes a reportable complaint. While humans may easily understand natural language communications and be able to determine whether a communication includes a complaint, humans may also be inconsistent in their determinations. With a large volume of communications, fatigue may also affect the analyst's determination.

In view of the foregoing, automation of review of consumer communications for complaint identification and reporting may be desirable. Further advantages will become apparent from the disclosure provided below.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In one aspect, the disclosure provides a method of determining, by a computer processor, whether to report a consumer message regarding a vehicle. The method may include receiving a message from a consumer regarding at least one vehicle, the message being preprocessed into a text format. The method may include applying the message to a machine learning classifier trained to determine whether a category of vehicle system is described in the message, the machine learning classifier trained using category definitions and corresponding parts and symptoms labeled with the category definitions. The method may include determining whether the message includes a complaint based on an ontology defining a vehicle problem lexicon, a car part lexicon, and lexical patterns. The method may include extracting minimal vehicle specificity (MVS) terms from the message. The method may include determining to report the message if the message includes a complaint related to at least one category of vehicle system for reporting and includes a set of MVS terms.

In another aspect, the disclosure provides a computer system for determining whether to report a consumer message regarding a vehicle. The computer system may include a memory storing executable instructions and a processor communicatively coupled with the memory. The processor may be configured to receive a message from a consumer regarding at least one vehicle, the message being preprocessed into a text format. The processor may be configured to apply the message to a machine learning classifier trained to determine whether a category of vehicle system is described in the message, the machine learning classifier trained using category definitions and corresponding parts and symptoms labeled with the category definitions. The processor may be configured to determine whether the message includes a complaint based on an ontology defining a vehicle problem lexicon, a car part lexicon, and lexical patterns. The processor may be configured to extract MVS terms from the message. The processor may be configured to determine to report the message if the message includes a complaint related to at least one category of vehicle system for reporting and includes a set of MVS terms.

In another aspect, the disclosure provides a non-transitory computer-readable medium storing computer executable instructions for determining, by a computer processor executing the instructions, whether to report a consumer message regarding a vehicle. The non-transitory computer-readable medium may include code to receive a message from a consumer regarding at least one vehicle, the message being preprocessed into a text format. The non-transitory computer-readable medium may include code to apply the message to a machine learning classifier trained to determine whether a category of vehicle system is described in the message, the machine learning classifier trained using category definitions and corresponding parts and symptoms labeled with the category definitions. The non-transitory computer-readable medium may include code to determine whether the message includes a complaint based on an ontology defining a vehicle problem lexicon, a car part lexicon, and lexical patterns. The non-transitory computer-readable medium may include code to extract MVS terms from the message. The non-transitory computer-readable medium may include code to determine to report the message if the message includes a complaint related to at least one category of vehicle system for reporting and includes a set of MVS terms.

These and other aspects of the disclosure will become more fully understood upon a review of the detailed description, which follows.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

Figure 1:
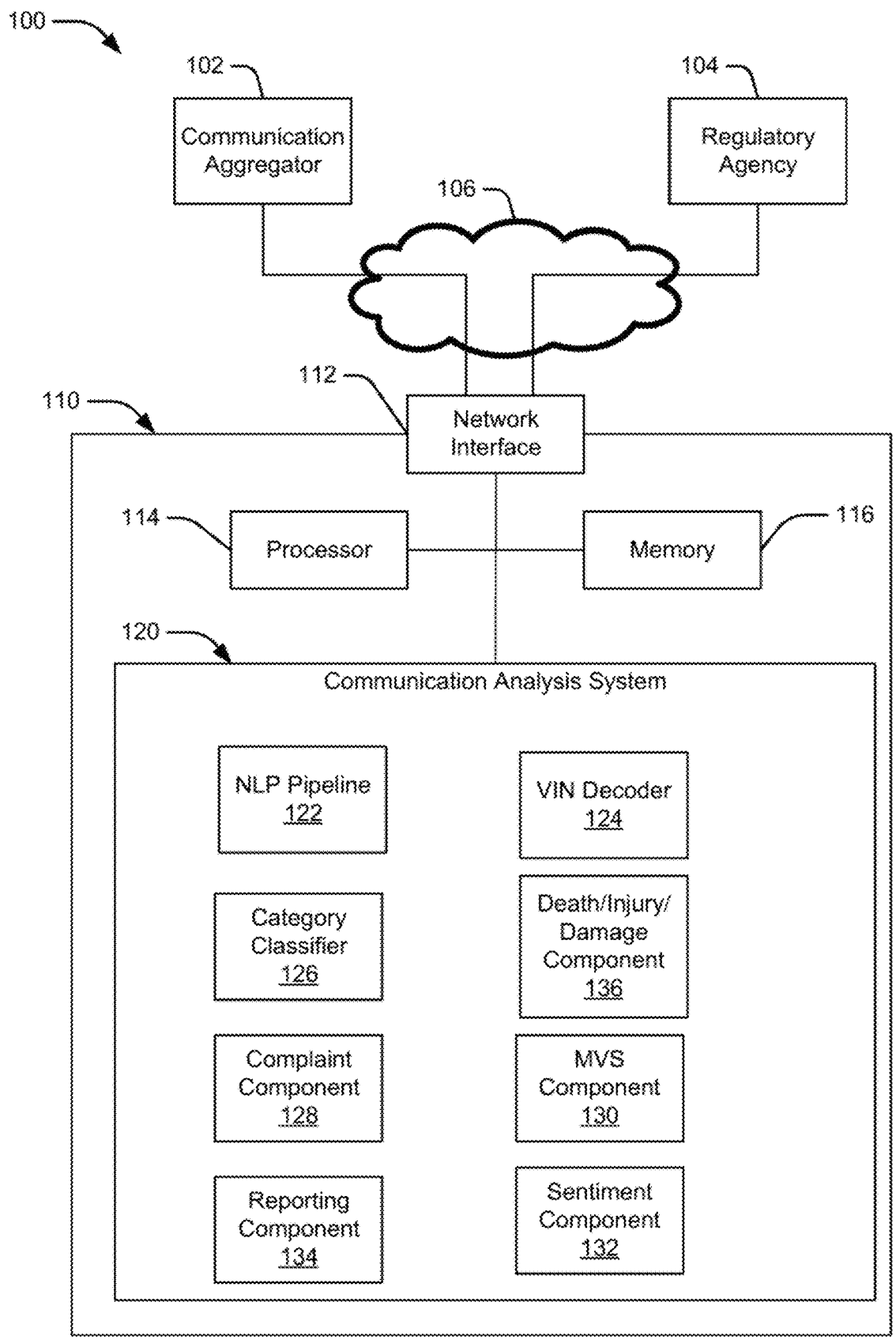
FIG. 1 illustrates a schematic view of an exemplary operating environment of a computer system including a communication analysis system for processing consumer messages in accordance with aspects of the present disclosure.

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection." as used herein may include a connection by which entities are "operably connected", is one in which signals, physical communications, and/or logical communications may be sent and/or received. An operable connection may include a physical interface, a data interface and/or an electrical interface.

A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, boats, personal watercraft, and aircraft. In some cases, a motor vehicle includes one or more engines.

Communications related to motor vehicles may pose several difficulties with respect to being understood by a computer. First, communications related to motor vehicles may include unique vocabulary. Motor vehicles are complicated machines with numerous parts, some of which may have similar names. Second, consumer communications that may include a complaint may not use formal names. Additionally, consumers may not exactly understand a problem with the vehicle, and may describe symptoms of a problem rather than the actual problem. Third, diverse communication channels may provide varying degrees of formality and clarity in the communications.

The present disclosure provides a natural language processing system for analyzing communications to determine whether consumer communications include reportable consumer complaints. The system may utilize an ontology created through a combination of machine learning and manually generated associations to determine whether a consumer communication relates to a reportable category. Further, the system may utilize the ontology to determine whether the consumer communication describes a problem that can be considered a complaint. The system may also use semantic rules to extract minimum vehicle specificity (MVS) information for reporting. Additionally, the system may analyze a sentiment of the consumer communication to determine whether the communication is a complaint.

Turning to FIG. 1, a schematic view of an example operating environment 100 of a computer system 110 for communication processing includes a communication aggregator 102, a regulatory agency 104, and a network 106.

The communication aggregator 102 may receive consumer communications from various sources and provide the consumer communications to the computer system 110 in a uniform format. For example, the communication aggregator 102 may convert all consumer communications to a text format. The communication aggregator 102 may append metadata describing an origin and time/date of receipt of each consumer communication.

The regulatory agency 104 may be a governmental, industry, business, or non-profit entity that requests or requires reporting of consumer complaint information. For example, the regulatory agency 104 may be the NHTSA or similar government agency regulating motor vehicle manufacturers. In some aspects, consumer complaint information may be useful for other entities, and the disclosed system may be adapted for specific requirements of those entities.

The network 106 may be a communications network that transmits packets. For example, the network 170 may be a local area network (LAN), wide area network (WAN), or the Internet. The network 106 may utilize various protocols including Internet Protocol (IP). Accordingly, the computer system 110 may transmit and receive data (e.g., data packets) to and from the communication aggregator 102 and the regulatory agency 104 via the network 106.

The components of the computer system 110, as well as the components of other systems, hardware architectures, and software architectures discussed herein, may be combined, omitted or organized into various implementations.

Computer system 110 may include a processor 114 and memory 116 and configured to control the operation of computer system 110. Memory 116 may be configured for storing data and/or computer-executable instructions defining and/or associated with an operating system and/or communication analysis system 120, and processor 114 may execute the operating system and/or communication analysis system 120. An example of memory 116 can include, but is not limited to, a type of memory usable by a computer, such as random access memory (RAM), read only memory (ROM), tapes, magnetic discs, optical discs, volatile memory, non-volatile memory, and any combination thereof. Memory 116 may store local versions of applications being executed by processor 114.

The processor 114 may include one or more processors for executing instructions. An example of processor 114 can include, but is not limited to, any processor specially programmed as described herein, including a controller, microcontroller, application specific integrated circuit (ASIC), field programmable gate array (FPGA), system on chip (SoC), or other programmable logic or state machine. The CPU processor may include other processing components such as an arithmetic logic unit (ALU), registers, and a control unit.

The computer system 110 may also include a network interface 112, which may include any wired or wireless network interface for providing wired or wireless computer communications utilizing various protocols to send/receive electronic signals internally with respect to features and systems within the computer system 110 and with respect to external devices. These protocols may include a wireless system utilizing radio-frequency (RF) communications (e.g., IEEE 802.11 (Wi-Fi), IEEE 802.15.1 (Bluetooth®)), a near field communication system (NFC) (e.g., ISO 13157), a local area network (LAN), a wireless wide area network (WWAN) (e.g., cellular) and/or a point-to-point system. As another example, computer system 110 may optionally include a universal serial bus (USB) interface. The network interface 112 of computer system 110 may be connected to a corresponding network interface of the communication aggregator 102 or regulatory agency 104 via the network 106.

The communication analysis system 120 may analyze each consumer message to determine whether the message is reportable, and if so, to extract specific information to be reported. The communication analysis system 120 may include a natural language processing (NLP) pipeline 122 for processing consumer messages to analyze the content of the messages, a vehicle identification number (VIN) decoder 124 for extracting and validating a VIN in the consumer message, a category classifier 126 for determining one or more reporting categories corresponding to contents of the consumer message, a complaint component 128 for determining whether the consumer message includes a complaint, a MVS component 130 for extracting minimum vehicle specificity information from the consumer message, a death/injury/damage component for determining whether the consumer message relates to specific reportable events, a sentiment component 132 for scoring a sentiment of the consumer message, and a reporting component 134 for determining whether the consumer message is reportable, and if so, reporting the consumer message.

The NLP pipeline 122 may receive a consumer communication and perform several processing stages. For example, the NLP pipeline 122 may perform pre-processing, named entity recognition, parts of speech identification, stemming, and lemmatization. The NLP pipeline 122 may perform named entity recognition on the consumer message based on an ontology. For example, the NLP pipeline 122 may determine which words in the consumer message correspond to one or more lexicons, for example, a car problem lexicon and a car part lexicon. Words that correspond to a lexicon may be referred to as named entities. Further details of the NLP pipeline 122 are described below with respect to FIG. 2.

The VIN decoder 124 may extract one or more potential VINs from a consumer message. The VIN decoder 124 may identify a potential VIN based on a length and content rule. For example, the VIN decoder 124 may consider potential VINs that are 17 characters and do not include the letters I, O, and Q. The VIN decoder 124 may perform a VIN validation by checking the value of a check digit within the VIN to determine whether the potential VIN is a valid VIN. In some aspects, the VIN decoder 124 may determine information about a vehicle based on an extracted VIN. For example, the VIN decoder 124 may look up the VIN in a manufacturer database to determine whether the VIN matches other information included in the consumer message. In some aspects, the VIN decoder 124 may supplement the consumer message with additional information based on the VIN. For example, if the consumer only provides a make and model year, the VIN decoder 124 may supplement the consumer message with a model based on a VIN lookup.

The category classifier 126 may determine one or more categories of vehicle system to which the consumer message relates. For example, the categories of the vehicle system may be defined by the regulatory agency 104. For instance, the NHTSA defines twenty-eight (28) category codes for TREAD EWR. In an aspect, for example, the category classifier 126 is a machine learning classifier trained using multiple sources of labeled data. Classification may be based on an ensemble of supervised learners including a support vector machine (SVM) and linear regression. The classification may utilize natural language processing based feature extraction. That is, only the words or phrases important for classification (e.g., car parts and related issues) are considered as features by the machine learning classifiers. This allows the system to filter out noise and achieve better results than standard ML alone. Ontology helps to define the domain model and organize the lexical information accordingly, driving the extraction of concepts and relations of interest. In other words, from a ML point of view, the ontology is a way to represent prior knowledge. For example, the training data may include NHTSA definitions of the category codes. Terms may be extracted from the NHTSA definition, and the category codes may be used as labels. The NHTSA definitions include key terms and part names associated with each category. The training data may also include manufacturer supplied parts, symptom, and category information. For example, a manufacturer may use specific names for parts in an owner's manual, repair manual, or other documentation. The manufacturer specific terminology may be used by the consumer in the consumer message. Accordingly, training the machine learning classifier with manufacturer specific terminology may improve classification of messages related to vehicles of the manufacturer. As another example, the symptom information may include terminology used to describe problems with vehicle systems. Such terminology may not be used in the NHTSA definitions, but may identify a category of vehicle system. For example, a term such as "tread wear" may not be included in NHTSA definitions or be the name of a part, but may be related to the tire category because it is a symptom of the tire part. Accordingly, the training data may include symptoms associated with parts and/or categories of vehicle system.

The complaint component 128 may determine whether a consumer message includes a complaint. In an aspect, the complaint component 128 may utilize an ontology including lexicons and relationships to determine whether the consumer message includes a complaint. The complaint component 128 may determine that a consumer message includes a complaint when the consumer message includes a car problem named entity associated with a car part named entity. Additionally, the complaint component 128 may define certain lexical patterns that indicate a car problem. For example phrases such as "rattling noise" and "oil leak" may indicate a car problem even if no car part named entity is used. A lexical pattern may be a restriction over a chain of consecutive lexical units and the respective label for a text fragment satisfying the restrictions. Restrictions can be based on lexicons, part of speech, surface text form (e.g., capital letters), or other characteristics of text.

The MVS component 130 may determine whether a consumer message includes minimum vehicle specificity information and extract the MVS information if available. The MVS information may include a manufacturer, model, and model year. In an aspect, the MVS information may come from the content of the consumer message and any metadata associated with the consumer message. In an aspect, the NLP pipeline 122 may use named entity recognition to identify words corresponding to lexicons for each of the manufacturer and mode. For example, a manufacturer lexicon may include names of known manufacturers. In particular, the manufacturer lexicon may include brand names for the manufacturer and related companies. Similarly, the lexicon for the model may include model names used by the manufacturer. The MVS component 130 may identify a model year using a regular expression to identify model years within a range. The MVS component 130 may also extract MVS information from metadata associated with the consumer message. For example, if the consumer message is received via a manufacturer specific email address, chat tool, or forum, the manufacturer may be included in the metadata. Additionally, as noted above, the VIN decoder 124 may be able to supplement the content of the consumer message if a VIN is included in the consumer message. The MVS component 130 may indicate whether a full set of MVS information is available for a consumer message.

The sentiment component 132 may determine a sentiment score for the consumer message. The sentiment score may be a positive number, neutral (0), or a negative number. The sentiment component 132 may use a machine learning classifier to determine the sentiment score for the consumer message. The machine learning classifier may look up the words from a sentiment lexicon and also recognize syntactic and grammatical clues around the word to capture negations or intensifiers. The classifier may also recognize emoticons. The machine learning classifier may be trained using sentiment scores for words. For example, SentiWordNet is a publicly available lexical resource providing positive, negative, and objective scores for terms. Additionally, the machine learning classifier may be trained using customer review of products, particularly vehicles. Such customer reviews may include a numerical score and text. The numerical score may be used as a label to train the classifier on the text.

The reporting component 134 may determine whether a consumer message is reportable. In an aspect, the reporting component 134 may determine that a consumer message is reportable when the consumer message satisfies three rules. First, the consumer message has MVS information. For example, the reporting component 134 may use the MVS component 130 to determine whether the consumer message has MVS information. Second, the consumer message includes a complaint. For example, the reporting component 134 may use the complaint component 128 to determine whether the consumer message includes a complaint. Third, the consumer message refers to a model year that is greater than a threshold. For example, the threshold may be based on the current year, and the threshold may be 9 years. Accordingly, complaints regarding vehicles more than 9 years old may not be reported.

The death/injury/damage component 136 may determine whether a consumer message relates to specific reportable events. In particular, events that involve the death of a person, injury to a person, or damage to real property may be reportable. The death/injury/damage component 136 may use lexicons and semantic relationships to identify such events within a consumer message. For example, a death lexicon may include keywords such as kill, dead, die. If the NLP pipeline 122 identifies a named entity corresponding to the death lexicon, the death/injury/damage component 136 may determine whether the named entity has a semantic relation (e.g., experiences) to a person named entity identified by a person lexicon including, for example, people, person, child, man, woman, and pronouns. Similarly, the death/injury/damage component 136 may identify an injury event using an injury lexicon, the experience semantic relation, and the person lexicon. The death/injury/damage component 136 may identify a property damage event using a damage lexicon, experience semantic relation, and property lexicon.

Figure 2:
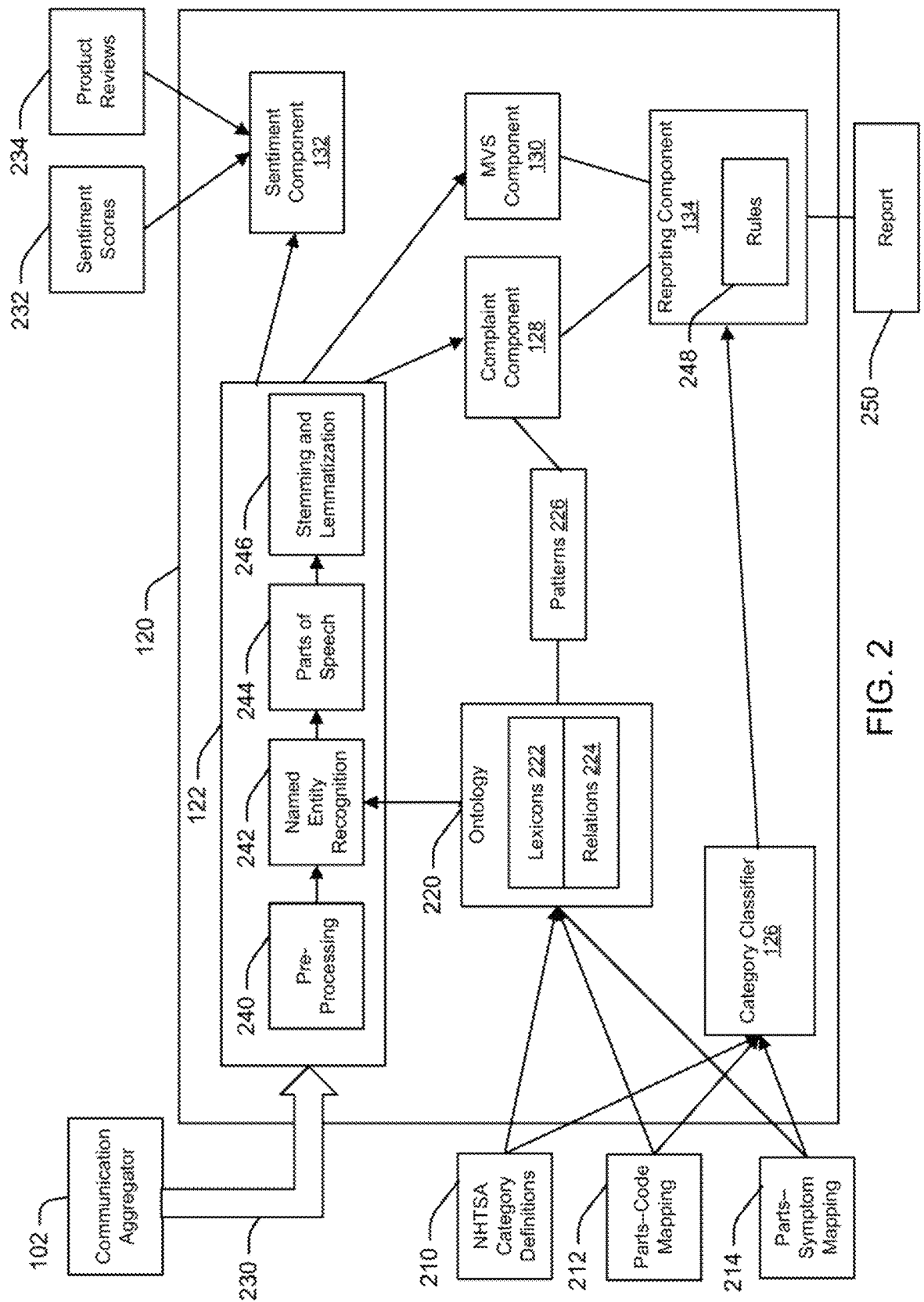
FIG. 2 illustrates a conceptual diagram showing data flow within the consumer analysis system in accordance with aspects of the present disclosure.

FIG. 2 is a conceptual diagram 200 illustrating data flow in the communication analysis system 120. Several components of the communication analysis system 120 may be built or trained based on various data sources. The data sources may be existing data sources that are used for a new purpose to train the components of the communication analysis system 120. The data sources may be updated periodically, and the components of the communication analysis system 120 may be retrained. Additionally, feedback loops may be used as an additional data source.

The category classifier 126 may be trained based on data sources that relate words to categories of vehicle systems. For example, the data sources for the category classifier 126 may include NHTSA category definitions 210, a parts-code mapping 212, and a parts-symptom mapping 214. The NHTSA category definitions 210 may be provided by the regulatory agency 104 (e.g., the NHTSA). The parts-code mapping 212 may be generated and maintained by a manufacturer. The parts-code mapping may map part names used by the manufacturer to the NHTSA category codes. The parts-symptom mapping 214 may be generated and maintained by a manufacturer. The parts-symptom mapping 214 may map terminology for vehicle symptoms to vehicle parts. In an aspect, any of the NHTSA category definitions 210, parts-code mapping 212, and parts-symptom mapping 214 may be combined, for example as tables in a relational database. The category classifier 126 may be trained using supervised training techniques on the NHTSA category definitions 210, parts-code mapping 212, and parts-symptom mapping 214, for example, with the NHTSA category code serving as a label.

The ontology 220 may be a representation of categories, properties, and relations of concepts, data, and entities that may be included in consumer messages relating to vehicles. The ontology 220 may be used by a processor (e.g., processor 114) to classify words in a consumer message as named entities. The ontology 220 may include lexicons 222 and relations 224. The lexicons 222 may be sets of words corresponding to a category. The relations 224 may describe relationships between members of two lexicons. The ontology 220 may be based on the same data sources as the category classifier 126. For example, the words in the NHTSA category definitions may be included in the lexicons 222, as well as the names of parts and symptoms. An example of the ontology 220 is discussed below with respect to FIG. 3. Additionally, patterns 226 may be defined using definitions from the ontology and represented separately in a defined relational database management system (RDBMS) or resource description framework (RDF). Lexical patterns may represent idioms, expressions, or phrases that do not necessarily fit into a restrictive ontology.

The sentiment component 132 may be trained based on sentiment scores 232 and product review 234. The sentiment scores 232 may provide one or more scores for words or groups of synonyms. The product reviews 234 may relate to motor vehicles and may include a numerical score and text description. Supervised learning may be used to train the sentiment component 132 to score the text of consumer messages based on the scores of the sentiment scores 232 and product reviews 234.

Consumer messages 230 may be received from the communication aggregator 102 and provided to the NLP pipeline 122. The NLP pipeline 122 may perform various processes to analyze the consumer messages. The NLP pipeline 122 may perform pre-processing 240, named entity recognition 242, parts of speech identification 244, and stemming and lemmatization 246. Pre-processing 240 may include formatting the text of the consumer message, for example, by removing capital letters and stop words. Named entity recognition 242 may be based on the ontology 220. Named entity recognition 242 may include matching words within the consumer message 230 to lexicons 222. Words that match a lexicon 222 may be referred to as a named entity. Parts of speech identification 244 may include associating the words in the consumer message 230 to grammatical parts of speech. Stemming and lemmatization 246 may include normalizing words within the consumer message 230 by reducing the words to a stem word. The output of the NLP pipeline 122 may be provided to the complaint component 128, MVS component 130, and death/injury/damage component 136, which may use semantic rules based on the named entities to determine whether the consumer message includes specific information, and extract the information if present. The output of the NLP pipeline 122 may also be provided to the sentiment component 132 to determine a sentiment score. The category classifier 126 and VIN decoder 124 may not depend on the processing performed by the NLP pipeline 122 and may receive the consumer message 230 directly.

The reporting component 134 may receive the output of the category classifier 126, MVS component 130, and complaint component 128. The reporting component 134 may determine whether the consumer message 230 is reportable based on the received output and a set of rules 248. For example, the rules 248 may include: a) a set of MVS terms is available, b) a vehicle year is greater than a threshold, and c) the message includes a complaint. The set of MVS terms may include the manufacturer, model, and year. The reporting component 134 may generate a report 250 including one or more reportable consumer messages.

Figure 3:
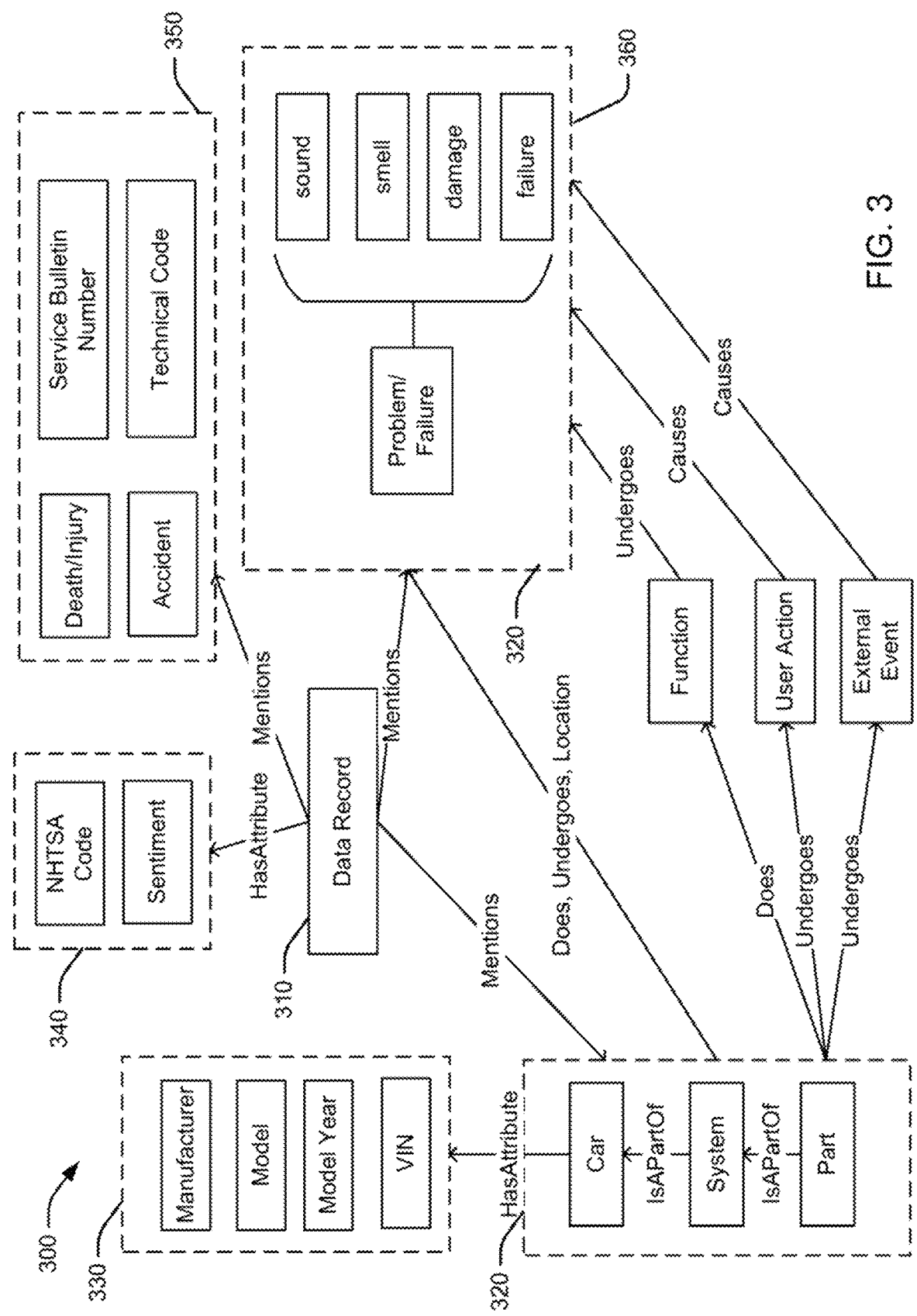
FIG. 3 illustrates an exemplary ontology for processing consumer messages regarding vehicles in accordance with aspects of the present disclosure.

FIG. 3 illustrates an example ontology 300, which may be an example of the ontology 220. Lexicons 222 are illustrated as blocks, and relations 224 are illustrated as arrows. Lexicons 222 may be grouped with functionally similar lexicons. The ontology 300 may include a data record lexicon 310, which may include any terms used to refer to a consumer message 230. Example lexicon groups include a vehicle group 320, a vehicle attribute group 330, a classification group 340, an event group 350, and a problem group 360. The vehicle group 320 may include lexicons for parts, systems, and cars. The lexicons within the vehicle group 320 may be related in that a part is a part of a system and a system is a part of a car. The attribute group 330 may include lexicons for manufacturer, model, model year, and VIN. The classification group 340 may include lexicons for NHTSA codes and sentiments. The event group 350 may include lexicons for death, injury, accidents, service bulletin number, and technical codes. The problem group 360 may include a problem lexicon and related symptom lexicons such as sound, smell, damage, and failure. Additionally, the problem group 360 may be related to the vehicle group 320 via actions lexicons such as function, user action, and external events.

Example relations 224 include "mentions," "has attribute," "does," "undergoes," "causes," "is part of" and "location." For example, a named entity in the data record lexicon 310 may mention an element of a vehicle group 320, event group 350, or problem group 360. The relations 224 may be defined in the ontology 300. The system may extract the relations 224 based on Semantic Calculus rules that combine underlying low-level semantic relations or syntactic links into the high-level relations 224. The Semantic Rules defining the relations 224 may operate on a higher level than the lexical patterns and do not require components to be consecutive.

Figure 4:
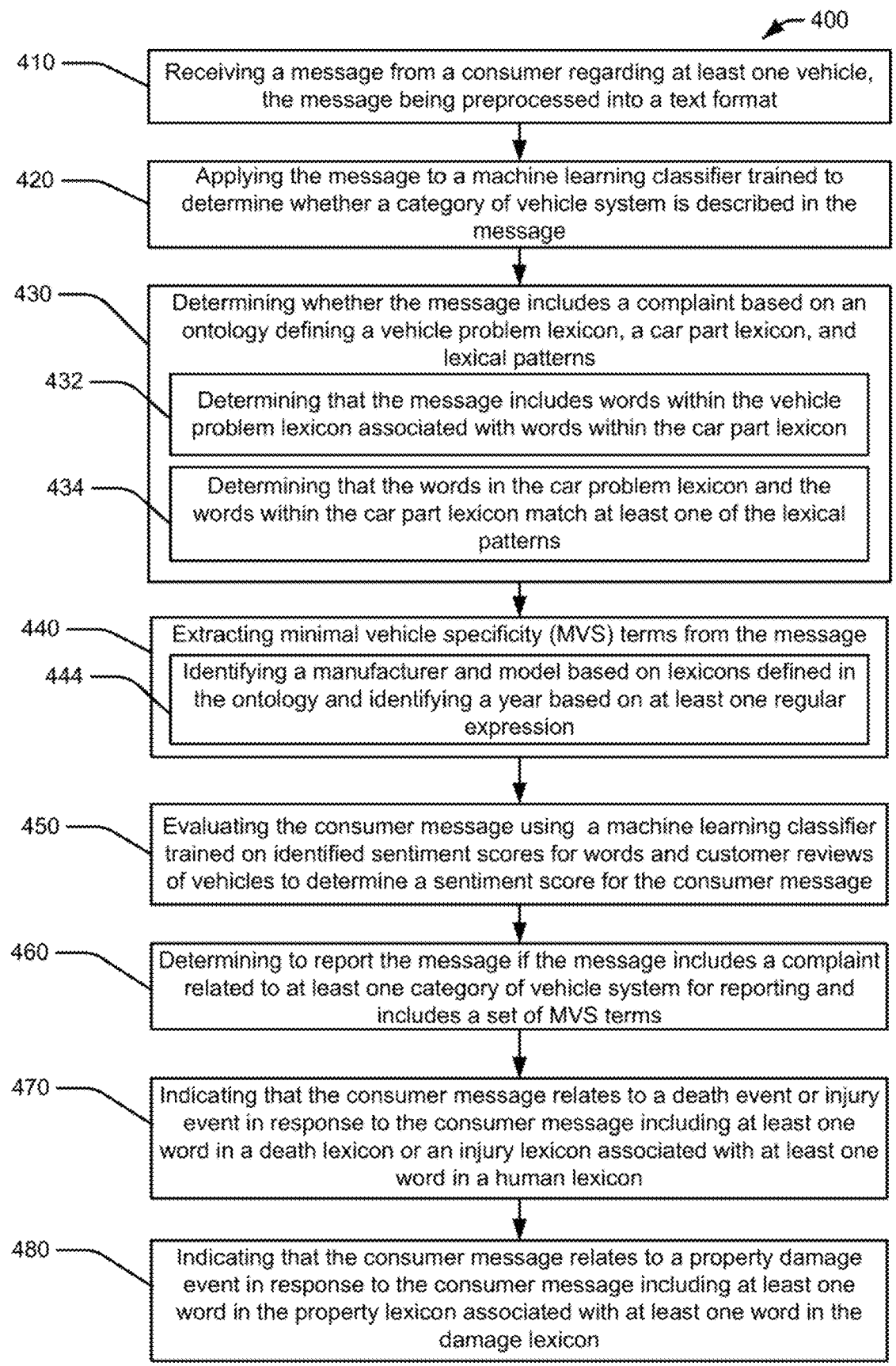
FIG. 4 illustrates a flowchart showing an exemplary method of processing consumer messages regarding vehicles, in accordance with aspects of the present disclosure.

FIG. 4 illustrates a flowchart showing an example method 400 of consumer message reporting, in accordance with aspects of the present disclosure. The method 400 may be performed by computer system 110 including a communication analysis system 120.

At block 410, the method 400 may include receiving a message from a consumer regarding at least one vehicle, the message being preprocessed into a text format. In an aspect, for example, the communication analysis system 120 may receive the message from the consumer regarding the at least one vehicle via a network interface 112 and via a communication aggregator 102. The message may be preprocessed into a text format by either the communication aggregator 102 or the pre-processing block 240.

At block 420, the method 400 may include applying the message to a machine learning classifier trained to determine whether a category of vehicle system is described in the message. In an aspect, for example, the communication analysis system 120 may execute the category classifier 126 to apply the message to a machine learning classifier trained to determine whether a category of vehicle system is described in the message. The machine learning classifier may be trained using category definitions and corresponding parts and symptoms labeled with the category definitions. For example, the category classifier 126 may be trained with the NHTSA category definitions 210, the parts-code mapping 212, and/or the parts-symptom mapping 214.

At block 430, the method 400 may include determining whether the message includes a complaint based on an ontology defining a vehicle problem lexicon, a car part lexicon, and lexical patterns. In an aspect, for example, the complaint component 128 may determine whether the message includes a complaint based on the ontology 220 defining a vehicle problem lexicon, a car part lexicon, and lexical patterns. In one aspect, at block 432, the block 430 may include determining that the message includes words within the vehicle problem lexicon associated with words within the car part lexicon. For example, the complaint component 128 may a semantic relation defined by the ontology to identify the association between the words within the vehicle problem lexicon the words within the car part lexicon. In another aspect, at block 434, the block 430 may include determining that the words in the car problem lexicon and the words within the car part lexicon match at least one of the lexical patterns. For example, the complaint component 128 may determine that the words in the car problem lexicon and the words within the car part lexicon match at least one of the lexical patterns 226. Additionally, determining whether the message includes a complaint may be further based on whether a category of vehicle system is described in the message. For example, if the message does not describe any category of vehicle system, the message may not be considered to include a reportable complaint. That is, a generic complaint may not be considered a reportable complaint.

At block 440, the method 400 may include extracting MVS terms from the message. In an aspect, for example, the MVS component 130 may extract MVS terms from the message. For example, at block 442, the MVS component 130 may identify a manufacturer and model based on lexicons defined in the ontology and identify a year based on at least one regular expression.

At block 450, the method 400 may include evaluating the consumer message using a machine learning classifier trained on identified sentiment scores for words and customer reviews of vehicles to determine a sentiment score for the consumer message. In an aspect, for example, the communication analysis system 120 may execute the sentiment component 132 to evaluate the consumer message using a machine learning classifier trained on identified sentiment scores for words and customer reviews of vehicles to determine a sentiment score for the consumer message.

At block 460, the method 400 may include determining to report the message if the message includes a complaint related to at least one category of vehicle system for reporting and includes a set of MVS terms. In an aspect, for example, the reporting component 134 may determining to report the message if the message includes a complaint related to at least one category of vehicle system for reporting and includes a set of MVS terms. In an aspect, the reporting component may determine to report the message in response to determining that the consumer message satisfies rules including: a) set of MVS terms are available, b) a vehicle year is greater than a threshold, and c) the message includes the complaint. The reporting component 134 may generate the report 250 including the consumer message. The reporting component 134 may transmit the report 250 to the regulatory agency 104.

At block 470, the method 400 may include indicating that the consumer message relates to a death event or injury event in response to the consumer message including at least one word in a death lexicon or an injury lexicon associated with at least one word in a human lexicon. For example, the death/injury/damage component 136 may indicate that the consumer message relates to a death event or injury event in response to the consumer message including at least one word in a death lexicon or an injury lexicon associated with at least one word in a human lexicon. The death/injury/ damage component 136 may include the indication in the report 250.

At block 480, the method 400 may include indicating that the consumer message relates to a property damage event in response to the consumer message including at least one word in the property lexicon associated with at least one word in the damage lexicon. For example, the death/injury/ damage component 136 may indicate that the consumer message relates to a property damage event in response to the consumer message including at least one word in the property lexicon associated with at least one word in the damage lexicon. The death/injury/damage component 136 may include the indication in the report 250.

Figure 5:
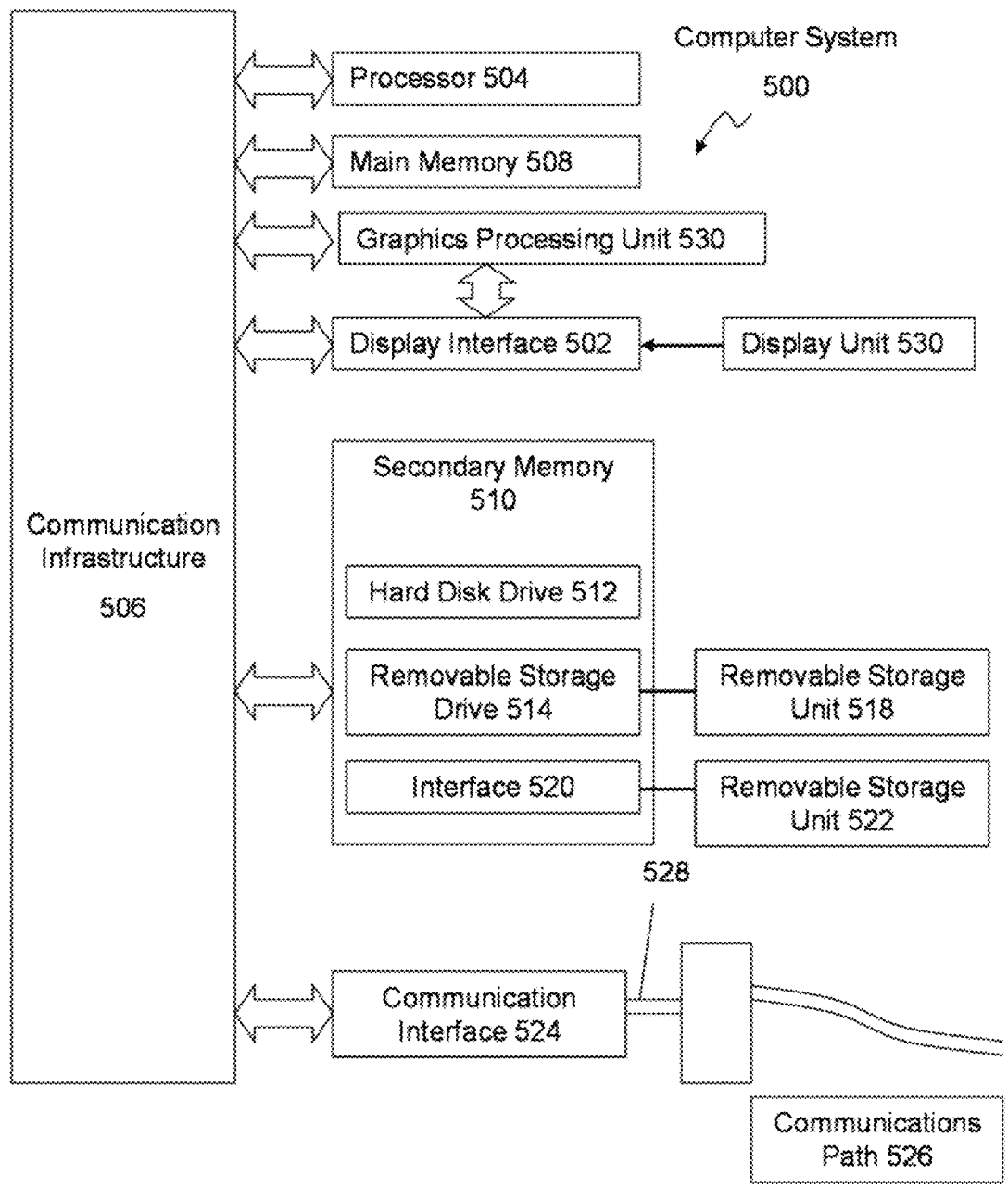
FIG. 5 presents an exemplary system diagram of various hardware components and other features, for use in accordance with aspects of the present disclosure.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein. FIG. 5 presents an example system diagram of various hardware components and other features that may be used in accordance with aspects of the present disclosure. Aspects of the present disclosure may be implemented using hardware, software, or a combination thereof and may be implemented in one or more computer systems or other processing systems. In one exemplary variation, aspects of the disclosure are directed toward one or more computer systems capable of carrying out the functionality described herein. An example of such a computer system 500 is shown in FIG. 5.

Computer system 500 includes one or more processors, such as processor 504. The processor 504 is connected to a communication infrastructure 506 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 500 may include a display interface 502 that forwards graphics, text, and other data from the communication infrastructure 506 (or from a frame buffer not shown) for display on a display unit 530. Computer system 500 also includes a main memory 508, preferably random access memory (RAM), and may also include a secondary memory 510. The secondary memory 510 may include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well-known manner. Removable storage unit 518, represents a floppy disk, magnetic tape, optical disk, etc., which is read by and written to removable storage drive 514. As will be appreciated, the removable storage unit 518 includes a computer usable storage medium having stored therein computer software and/or data.

In alternative aspects, secondary memory 510 may include other similar devices for allowing computer programs or other instructions to be loaded into computer system 500. Such devices may include, for example, a removable storage unit 522 and an interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a Personal Computer Memory Card International Association (PCMCIA) slot and card, etc. Software and data transferred via communications interface 524 are in the form of signals 528, which may be electronic, electromagnetic, optical or other signals capable of being received by communications interface 524. These signals 528 are provided to communications interface 524 via a communications path (e.g., channel) 526. This path 526 carries signals 528 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 580, a hard disk installed in hard disk drive 570, and signals 528. These computer program products provide software to the computer system 500. Aspects of the disclosure are directed to such computer program products.

Computer programs (also referred to as computer control logic) are stored in main memory 508 and/or secondary memory 510. Computer programs may also be received via communications interface 524. Such computer programs, when executed, enable the computer system 500 to perform various features in accordance with aspects of the present disclosure, as discussed herein. In particular, the computer programs, when executed, enable the processor 504 to perform such features. Accordingly, such computer programs represent controllers of the computer system 500.

In variations where aspects of the disclosure are implemented using software, the software may be stored in a computer program product and loaded into computer system 500 using removable storage drive 514, hard disk drive 512, or communications interface 520. The control logic (software), when executed by the processor 504, causes the processor 504 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

Figure 6:
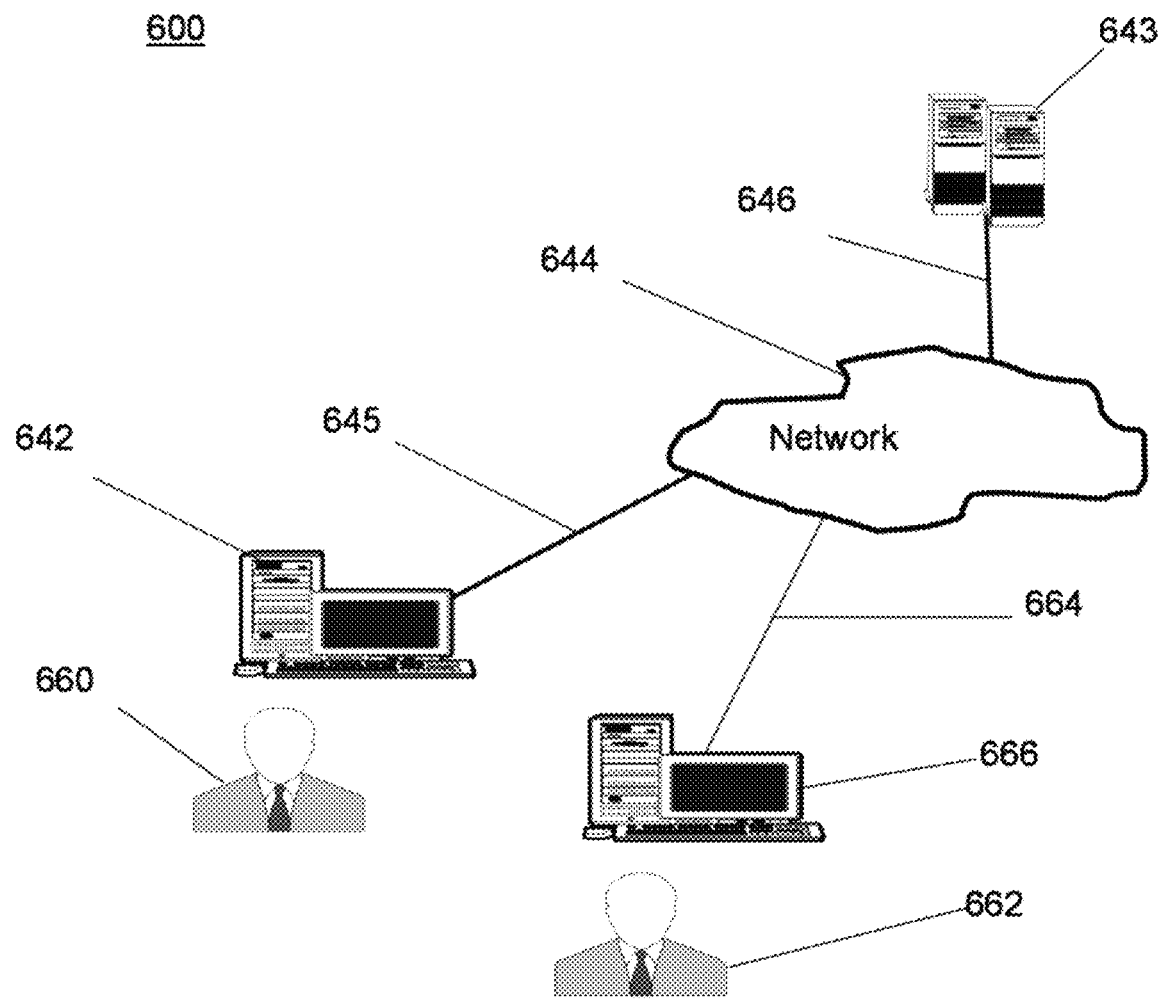
FIG. 6 is a block diagram of various exemplary system components, for use in accordance with aspects of the present disclosure.

FIG. 6 is a block diagram of various example system components that may be used in accordance with aspects of the present disclosure. For example, the various components may be within the computer system 110, or only some of the components may be within the computer system 110, and other components may be remote from the computer system 110. The system 600 includes one or more accessors 660, 662 (also referred to interchangeably herein as one or more "users") and one or more terminals 642, 666 (such terminals may be or include, for example, various features of the computer system 110). In one aspect, data for use in accordance with aspects of the present disclosure is, for example, input and/or accessed by accessors 660, 662 via terminals 642, 666, such as personal computers (PCs), minicomputers, mainframe computers, microcomputers, telephonic devices, or wireless devices, such as personal digital assistants ("PDAs") or a hand-held wireless devices coupled to a server 643, such as a PC, minicomputer, mainframe computer, microcomputer, or other device having a processor and a repository for data and/or connection to a repository for data, via, for example, a network 644, such as the Internet or an intranet, and couplings 645, 646, 664. The couplings 645, 646, 664 include, for example, wired, wireless, or fiber optic links. In another example variation, the method and system in accordance with aspects of the present disclosure operate in a stand-alone environment, such as on a single terminal.

The aspects of the disclosure discussed herein may also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, or other data.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

The invention claimed is:

1. A method of determining, by a computer processor, whether to report a message regarding a vehicle, comprising:
    receiving a message from a consumer regarding at least one vehicle, the message being preprocessed into a text format;
    applying the message to a machine learning classifier trained to determine whether a category of vehicle system is described in the message, the machine learning classifier trained using category definitions and corresponding parts and symptoms labeled with the category definitions;
    determining whether the message includes a complaint based on an ontology defining a vehicle problem lexicon, a car part lexicon, and lexical patterns;
    extracting minimal vehicle specificity (MVS) terms from the message; and
    determining to report the message if the message includes a complaint related to at least one category of vehicle system for reporting and includes a set of MVS terms, wherein determining to report the message includes determining that the message satisfies rules including:
    a) set of MVS terms is available,
    b) a vehicle year is greater than a threshold, and
    c) the message includes the complaint.

2. The method of claim 1, wherein the category definitions include a regulatory agency category description.

3. The method of claim 1, wherein determining whether the message includes a complaint comprises:
    determining that the message includes words within the vehicle problem lexicon associated with words within the car part lexicon; and
    determining that the words in the car problem lexicon and the words within the car part lexicon match at least one of the lexical patterns.

4. The method of claim 3, wherein an association between the words within the vehicle problem lexicon the words within the car part lexicon is defined by a semantic relation of the ontology.

5. The method of claim 1, further comprising:
evaluating the message using a machine learning classifier trained on identified sentiment scores for words and customer reviews of vehicles to determine a sentiment score for the message.

6. The method of claim 1, wherein the machine learning classifier utilizes a support vector machine and linear regression based on features identified by the ontology.

7. The method of claim 1, wherein the ontology further defines a human lexicon, a death lexicon, and an injury lexicon, wherein the method further comprises indicating that the message relates to a death event or injury event in response to the message including at least one word in the death lexicon or the injury lexicon associated with at least one word in the human lexicon.

8. The method of claim 1, wherein the ontology further defines a property lexicon, and a damage lexicon, wherein the method further comprises indicating that the message relates to a property damage event in response to the message including at least one word in the property lexicon associated with at least one word in the damage lexicon.

9. The method of claim 1, wherein extracting the MVS terms comprises identifying a manufacturer and model based on lexicons defined in the ontology and identifying a year based on at least one regular expression.

10. A computer system for determining whether to report a message regarding a vehicle, comprising:
a memory storing executable instructions; and
a processor communicatively coupled with the memory, the processor configured to:
receive a message from a consumer regarding at least one vehicle, the message being preprocessed into a text format;
apply the message to a machine learning classifier trained to determine whether a category of vehicle system is described in the message, the machine learning classifier trained using category definitions and corresponding parts and symptoms labeled with the category definitions;
determine whether the message includes a complaint based on an ontology defining a vehicle problem lexicon, a car part lexicon, and lexical patterns;
extract minimal vehicle specificity (MVS) terms from the message; and
determine to report the message if the message includes a complaint related to at least one category of vehicle system for reporting and includes a set of MVS terms, wherein the processor is configured to determine to report the message in response to determining that the message satisfies rules including:
a) a set of MVS terms is available,
b) a vehicle year is greater than a threshold, and
c) the message includes the complaint.

11. The computer system of claim 10, wherein the category definitions include a regulatory agency category description.

12. The computer system of claim 10, wherein the processor is configured to:
determine that the message includes words within the vehicle problem lexicon associated with words within the car part lexicon; and
determine that the words in the car problem lexicon and the words within the car part lexicon match at least one of the lexical patterns.

13. The computer system of claim 12, wherein an association between the words within the vehicle problem lexicon the words within the car part lexicon is defined by a semantic relation of the ontology.

14. The computer system of claim 10, wherein the processor is configured to evaluate the message using a machine learning classifier trained on identified sentiment scores for words and customer reviews of vehicles to determine a sentiment score for the message.

15. The computer system of claim 10, wherein the machine learning classifier utilizes a support vector machine and linear regression based on features identified by the ontology.

16. The computer system of claim 10, wherein the ontology further defines a human lexicon, a death lexicon, and an injury lexicon, wherein the processor is configured to indicate that the message relates to a death event or injury event in response to the message including at least one word in the death lexicon or the injury lexicon associated with at least one word in the human lexicon.

17. The computer system of claim 10, wherein the ontology further defines a property lexicon, and a damage lexicon, wherein the processor is configured to indicate that the message relates to a property damage event in response to the consumer message including at least one word in the property lexicon associated with at least one word in the damage lexicon.

18. A non-transitory computer-readable medium storing computer executable instructions for determining, by a computer processor executing the instructions, whether to report a message regarding a vehicle, the non-transitory computer-readable medium comprising code to:
receive a message from a consumer regarding at least one vehicle, the message being preprocessed into a text format;
apply the message to a machine learning classifier trained to determine whether a category of vehicle system is described in the message, the machine learning classifier trained using category definitions and corresponding parts and symptoms labeled with the category definitions;
determine whether the message includes a complaint based on an ontology defining a vehicle problem lexicon, a car part lexicon, and lexical patterns;
extract minimal vehicle specificity (MVS) terms from the message; and
determine to report the message if the message includes a complaint related to at least one category of vehicle system for reporting and includes a set of MVS terms, wherein the code to determine to report the message includes code to determine to report the message in response to determining that the message satisfies rules including:
a) a set of MVS terms is available,
b) a vehicle year is greater than a threshold, and
c) the message includes the complaint.

19. The non-transitory computer-readable medium of claim 18, wherein the ontology further defines a human lexicon, a death lexicon, and an injury lexicon, wherein the non-transitory computer-readable medium further comprises code to indicate that the message relates to a death event or injury event in response to the message including at least one word in the death lexicon or the injury lexicon associated with at least one word in the human lexicon.

20. The non-transitory computer-readable medium of claim 18, wherein the ontology further defines a property lexicon, and a damage lexicon, wherein the non-transitory computer-readable medium further comprises code to indicate that the message relates to a property damage event in response to the message including at least one word in the property lexicon associated with at least one word in the damage lexicon.

\* \* \* \* \*